(12) United States Patent  (10) Patent No.: US 7,843,712 B2
Lee                       (45) Date of Patent:     Nov. 30, 2010

(54) CHARGE PUMP FOR POSITIVE PUMPING AND NEGATIVE PUMPING

(75) Inventor: Yong-Seop Lee, Seoul (KR)

(73) Assignee: Dongbu HiTek Co., Ltd., Seoul (KR)

( * ) Notice: Subject to any disclaimer, the term of this patent is extended or adjusted under 35 U.S.C. 154(b) by 529 days.

(21) Appl. No.: 11/849,716

(22) Filed: Sep. 4, 2007

(65) Prior Publication Data

US 2008/0130329 A1    Jun. 5, 2008

(30) Foreign Application Priority Data

Nov. 30, 2006  (KR)  ........................ 10-2006-0119470

(51) Int. Cl.
*H02M 3/18*  (2006.01)
(52) U.S. Cl. ........................... 363/60; 363/63; 327/536
(58) Field of Classification Search .............. 363/59–60, 363/63; 327/536; 257/299; 307/110
See application file for complete search history.

(56) References Cited

U.S. PATENT DOCUMENTS

| 5,229,708 | A | * | 7/1993 | Donig et al. ................. 323/223 |
| 5,808,506 | A | * | 9/1998 | Tran ............................. 327/537 |
| 5,812,018 | A | * | 9/1998 | Sudo et al. ................... 327/537 |
| 6,023,188 | A | * | 2/2000 | Lee et al. ..................... 327/536 |
| 6,147,547 | A |   | 11/2000 | Ogura et al. |
| 6,184,741 | B1 | * | 2/2001 | Ghilardelli et al. ........... 327/536 |
| 6,418,040 | B1 |   | 7/2002 | Meng |
| 6,429,724 | B1 | * | 8/2002 | Ogura et al. ................. 327/536 |
| 6,538,930 | B2 | * | 3/2003 | Ishii et al. .............. 365/189.09 |
| 6,759,766 | B2 |   | 7/2004 | Hiratsuka et al. |
| 2006/0146583 | A1 |   | 7/2006 | Naka et al. |

FOREIGN PATENT DOCUMENTS

| CN | 1448818       |   | 10/2003 |
| DE | 10107658      |   | 5/2002  |
| DE | 69627142      |   | 10/2003 |
| JP | 07-177729     |   | 7/1995  |
| JP | 2000-049299   |   | 2/2000  |
| JP | 2000134911 A  | * | 5/2000  |
| JP | 2003-189595   |   | 7/2003  |

* cited by examiner

*Primary Examiner*—Harry Behm
(74) *Attorney, Agent, or Firm*—Sherr & Vaughn, PLLC

(57)  ABSTRACT

A miniaturized system on a chip that incorporates a positive high voltage charge pump and a negative high voltage charge pump into one pump circuit and shares components. A voltage control apparatus in a semiconductor device may include at least one of the following: First and second input/output units capable of inputting or outputting voltage. A voltage booster that receives and boosts a voltage from one of the first and second input/output unit and outputs the boosted voltage from the other input/output unit. An output selector that receives the boosted voltage from the voltage booster and selects one of the positive or the negative voltage to output. An output controller that receives the boosted voltage from the voltage booster and controls and/or regulates the output voltage. An output unit that outputs the generated output voltage.

8 Claims, 12 Drawing Sheets

CHARGE PUMP FOR POSITIVE PUMPING AND NEGATIVE PUMPING

The present application claims priority under 35 U.S.C. 119 to Korean Patent Application No. 10-2006-0119470 (filed on Nov. 30, 2006), which is hereby incorporated by reference in its entirety.

BACKGROUND

A charge pump may output a positive high-voltage or a negative high-voltage that has a larger magnitude than a voltage supplied from a power supply. For example, a charge pump may be used in a back-bias voltage generator of a semiconductor device (e.g. DRAM or other similar semiconductor device). A charge pump may be used in a voltage generator which generates voltages for writing/erasing data in a cell of an EPROM, an EEPROM, a flash memory element, or other similar devices. A charge pump may be used in a DC-DC converter for components that require a voltage higher than a system voltage.

Figure 1:
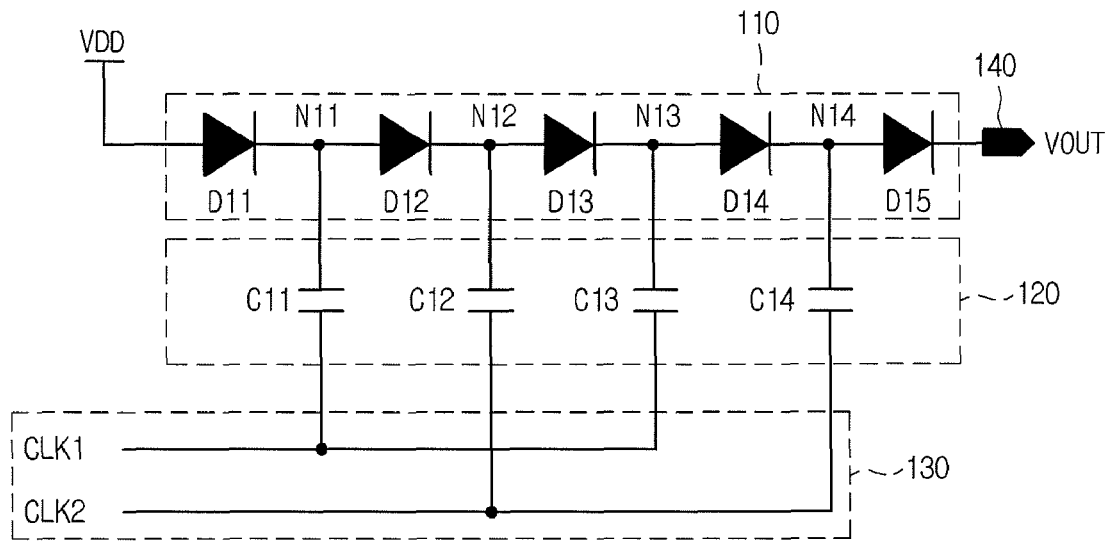

Example FIG. 1 is a circuit diagram illustrating a positive high-voltage charge pump. A positive high voltage charge pump circuit may include a power supply VDD, a diode unit 110, a capacitor unit 120, a clock unit 130, and an output terminal VOUT 140. Power supply VDD may be used as a power supply for generating a positive high voltage.

Diode unit 110 may include diode D11 connected to input power supply VDD in a forward direction. Diodes D12, D13, D14 and D15 may be serially and sequentially connected in a forward direction.

Capacitor unit 120 may include capacitors C11, C12, C13, and C14 arranged in parallel. Capacitors C11, C12, C13, and C14 may each be to the outputs of diodes D11, D12, D13, and D14. A first clock signal CLK1 in clock unit 130 may be connected to capacitors C11 and C13. A second clock signal CLK2 in clock unit 130 may be connected to capacitors C12 and C13. For example, node N11 may be connected to the output of diode D11, the input of diode D12, and one terminal of capacitor C11; the other terminal of capacitor C11 may be connected to first clock signal CLK1. Node N12 may be connected to the output of diode D12, the input of diode D13, and one terminal of capacitor C12; the other terminal of capacitor C12 may be connected to second clock signal CLK2. Node N13 may be connected to the output of diode D13, the input of diode D14, and one terminal of capacitor C13; the other terminal of capacitor C13 may be connected to first clock signal CLK1. Node N14 may be connected to the output of diode D14, the input of diode D15, and one terminal of capacitor C14; the other terminal of capacitor C14 may be connected to second clock signal CLK2. The output terminal VOUT 140 may output a positive high voltage generated by a pump operation.

Figure 2:
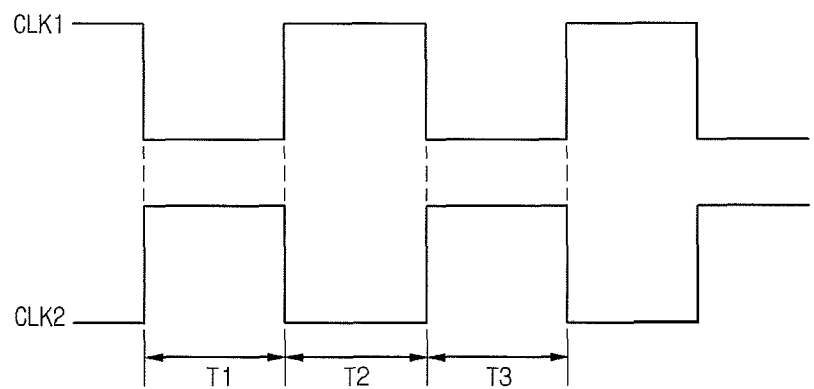

Example FIG. 2 illustrates a timing chart of first clock signal CLK1 and second clock signal CLK2. First clock signal CLK1 and second clock signal CLK2 may be out of phase by 180°.

For purposes of explanation and simplicity, it is assumed that threshold voltage Vth of the diodes D11, D12, D13, D14, and D15 are the same; however one of ordinary skill in the art would appreciate that the threshold voltages may be different. As illustrated in the clock input diagram of example FIG. 2, VSS (e.g. a ground level voltage) may be input to one terminal of capacitor C11 during time period T1 of CLK1. Voltage VDD may be input into diode D11 and voltage VDD−Vth may be output from diode D11; in other words, the voltage output from diode D11 may be reduced by threshold voltage Vth. Accordingly, the voltage at node N11 may be VDD−Vth. The capacitance charged in capacitor C11 during time period T1 may be Q1=C11×{(VDD−Vth)−VSS}.

As illustrated in the clock input diagram of example FIG. 2, when CLK1 is in time period T2, a voltage of VDD is input into the terminal of capacitor C11 that is connected to CLK1. The capacitance of capacitor C11 may remain constant. Accordingly, node N11 will become 2VDD−Vth during time period T2. During time period T2, VSS (e.g. ground level voltage) may be input into the terminal of capacitor C12 that is connected to CLK2. Diode D12 may output to node N12 a voltage of node N11 minus Vth (i.e. 2VDD−2Vth). Accordingly, the capacitance charged in capacitor C12 may be Q2=C12×{(2VDD−2Vth)−VSS}.

As illustrated in the clock input diagram of example FIG. 2, during time period T3, the voltage of VDD of CLK2 is input into capacitor C12. During time period T3, since the capacitance charged in capacitor C12 may be constant, node N12 may become VDD (voltage level of CLK2 terminal of capacitor C12) plus 2VDD−2Vth (voltage charge of capacitor C12), which is 3VDD−2Vth. During time period T3, VSS (i.e. ground level voltage) from CLK1 is input into capacitor C13. Accordingly, diode D13 outputs the voltage of 3VDD−3Vth. Accordingly, the capacitance charged in capacitor C13 may be Q3=C13×{(3VDD−3Vth)−VSS}.

Figure 3:
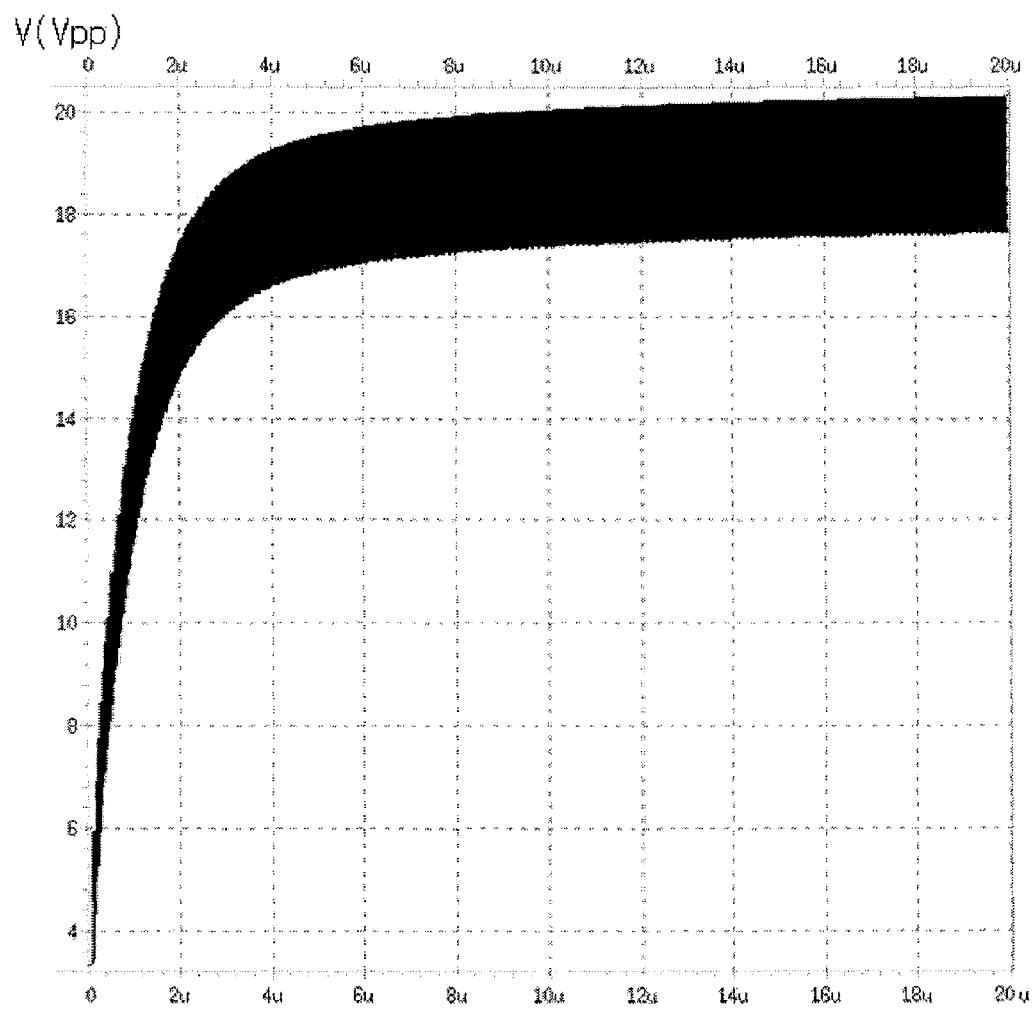

When the clocks CLK1, CLK2 are continuously input, output terminal VOUT 140 may output a voltage of 5VDD−5Vth. Therefore, the positive high voltage charge pump can generate a voltage higher than input voltage VDD. Example FIG. 3 is a diagram of the positive high voltage charge pump simulation.

Figure 4:
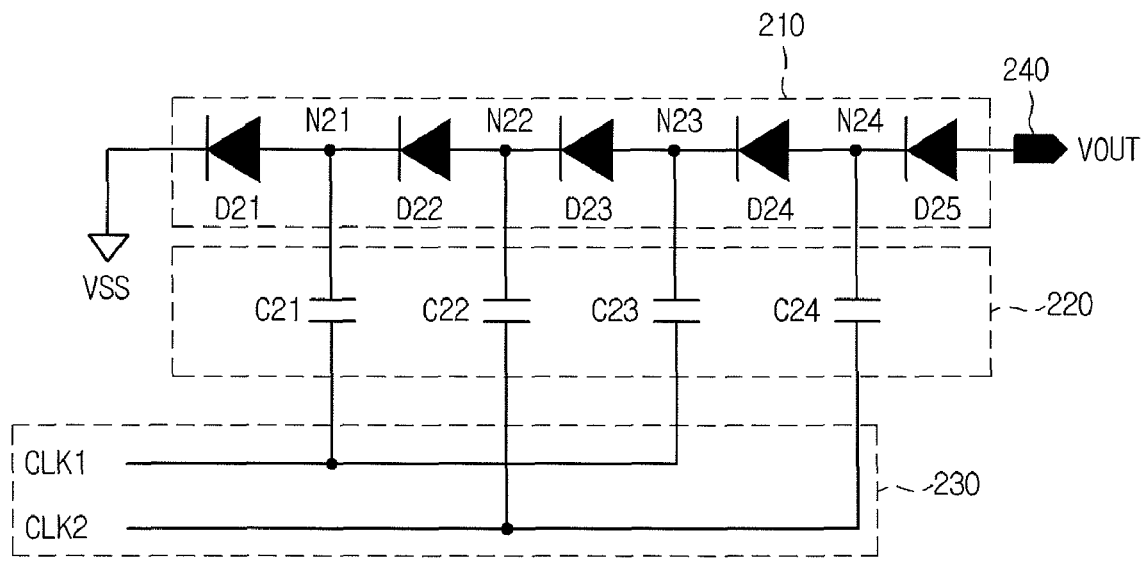

Example FIG. 4 is a circuit diagram illustrating a negative high voltage charge pump. A negative high voltage charge pump circuit may includes a power supply VSS, a diode unit 210, a capacitor unit 220, a clock unit 230, and an output terminal VOUT 240. Power supply VSS may used as the power supply to generate a negative high voltage.

Diode unit 210 may include a diode D21 connected to an input power supply VSS in a reverse direction. Diodes D22, D23, D24 and D25 may be serially and sequentially connected in a reverse direction. Capacitor unit 220 may include capacitors C21, C22, C23, and C24 in parallel with each other. Each of capacitors C21, C22, C23, and C24 may be connected to the inputs of diodes D21, D22, D23, and D24 respectively. First clock signal CLK1 in clock unit 230 may be connected to capacitor C21 and capacitor C23. Second clock signal CLK2 in clock unit 230 may be connected to capacitors C22 and C24. For example, capacitor C21 may have one terminal connected to node N21 and another terminal connected to CLK1. Capacitor C22 may have one terminal connected to node N22 and another terminal connected to CLK2. Capacitor C23 may have one terminal connected to N23 and another terminal connected to CLK1. Capacitor C24 may have one terminal connected to node N24 and another terminal connected to CLK2. An example timing chart of first clock signal CLK1 and second clock signal CLK2 are illustrated in example FIG. 2. First clock signal CLK1 and second clock signal CLK2 may have a phase difference of 180°.

Figure 5:
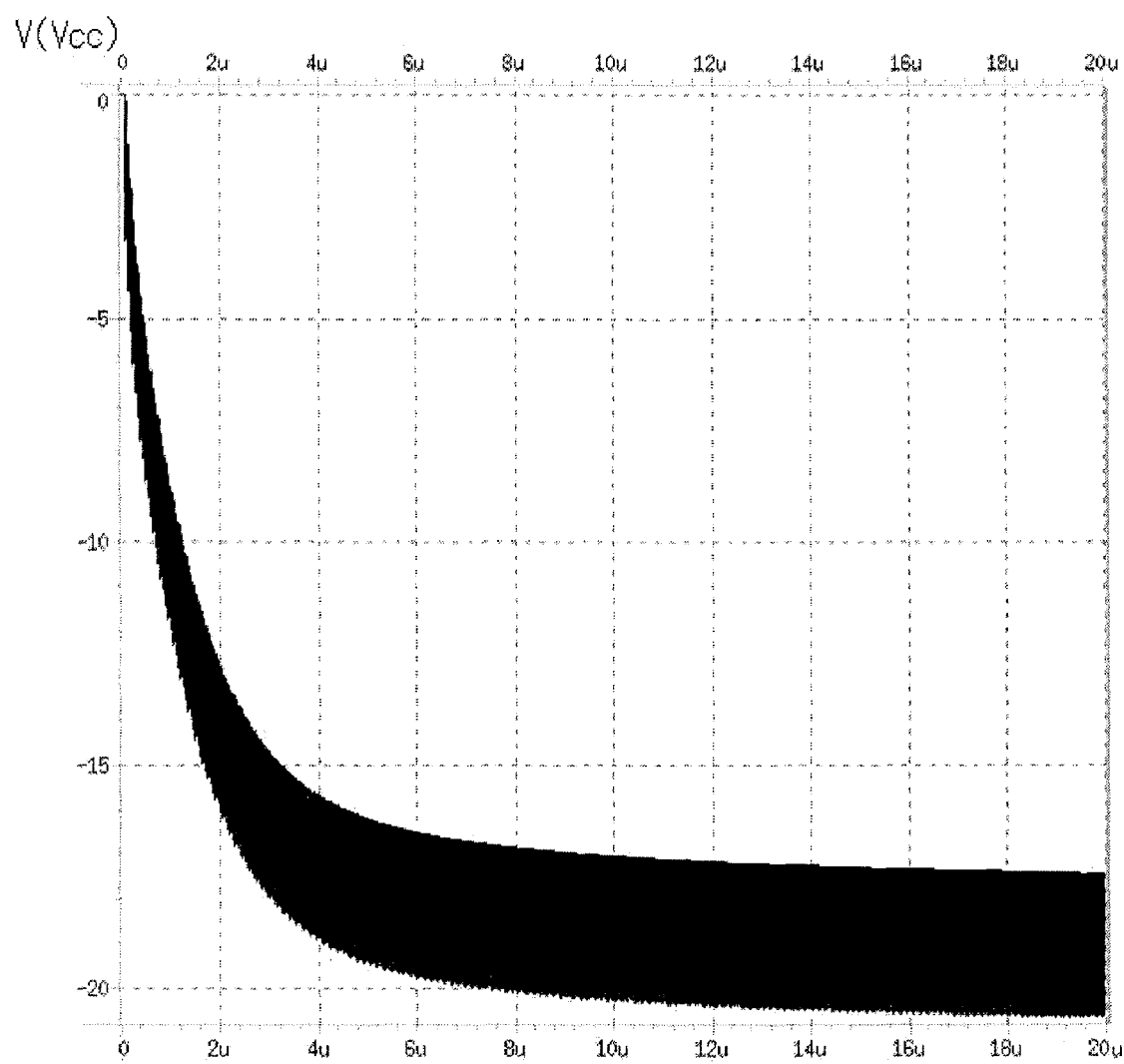

Output terminal VOUT 240 may output a negative high voltage generated by a pump operation. The operation of a negative high voltage charge pump is generally opposite to the operation of a positive high voltage charge pump. For example, the connecting direction of the diodes and the input power supply are opposite. Example FIG. 5 is an example diagram of a negative high voltage charge pump simulation.

If a device requires both a positive charge pump and a negative charge pump, the device should include a charge pump circuit for each function. For example, a device may require a circuit that includes the positive charge pump circuit illustrate in example FIG. 1 and the negative charge pump circuit illustrated in example FIG. 2. Having two different charge pump circuits may cause complications when miniaturizing a system on chip. Separate charge pumps circuits may each require a regulator for regulating a desired voltage level, which may cause complications when miniaturizing a system on a chip.

A positive high voltage charge pump and a negative high voltage charge pump may be used as individual devices. Production flexibility may be limited as each device is specific to either positive charge pumping or negative charge pumping. Development costs may be unnecessarily spent, as each type of charge pump needs to be independently designed and verified.

SUMMARY

Embodiments relate to a miniaturized system on a chip that incorporates a positive high voltage charge pump and a negative high voltage charge pump into one pump circuit and shares components. Embodiment relates to a voltage control apparatus in a semiconductor device which includes at least one of the following: First and second input/output units capable of inputting or outputting voltage. A voltage booster that receives and boosts a voltage from one of the first and second input/output unit and outputs the boosted voltage from the other input/output unit. An output selector that receives the boosted voltage from the voltage booster and selects one of the positive or the negative voltage to output. An output controller that receives the boosted voltage from the voltage booster and controls and/or regulates the output voltage. An output unit that outputs the generated output voltage.

DRAWINGS

Example FIG. 1 illustrates a circuit diagram of a positive high voltage charge pump.

Example FIG. 2 illustrates a clock input diagram.

Example FIG. 3 illustrates a positive high voltage charge pump simulation.

Example FIG. 4 illustrates a circuit diagram of a negative high voltage charge pump.

Example FIG. 5 illustrates a negative high voltage charge pump simulation.

Figure 6A:
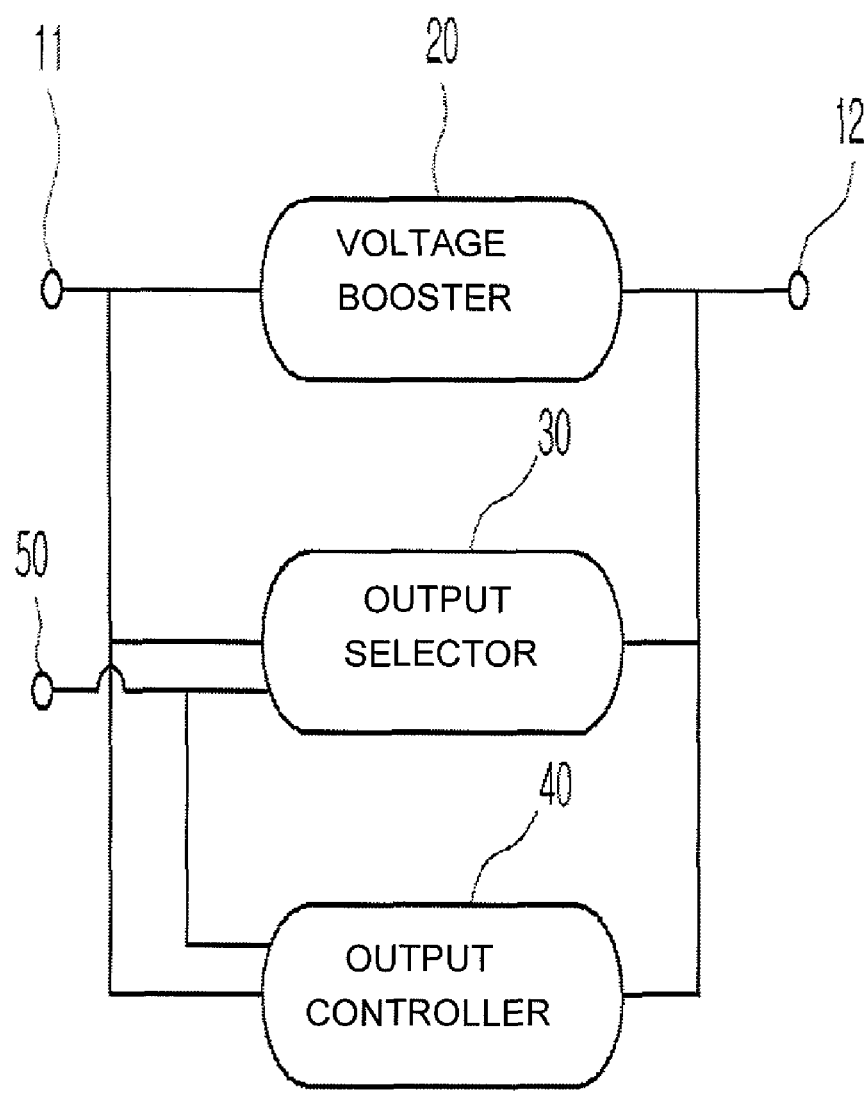

Example FIG. 6A illustrates a block diagram illustrating a voltage control apparatus, in accordance with embodiments.

Figure 6B:
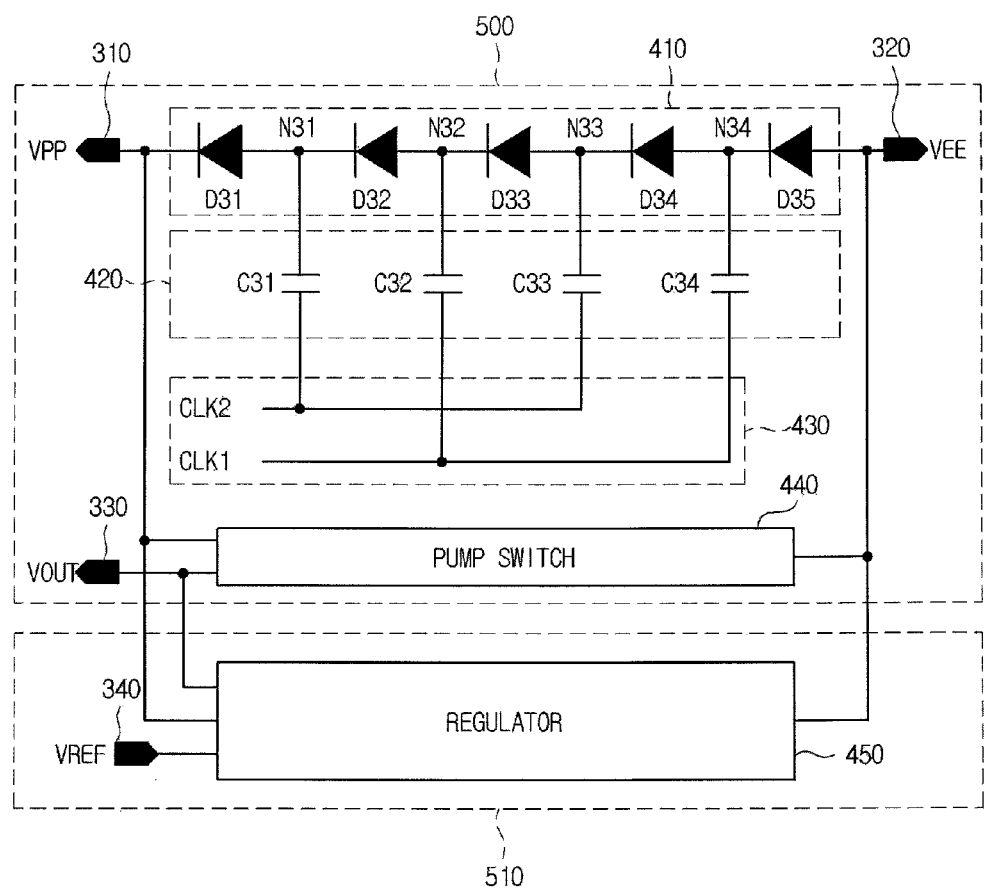

Example FIG. 6B illustrates a circuit diagram illustrating a voltage control apparatus, in accordance with embodiments.

Figure 7:
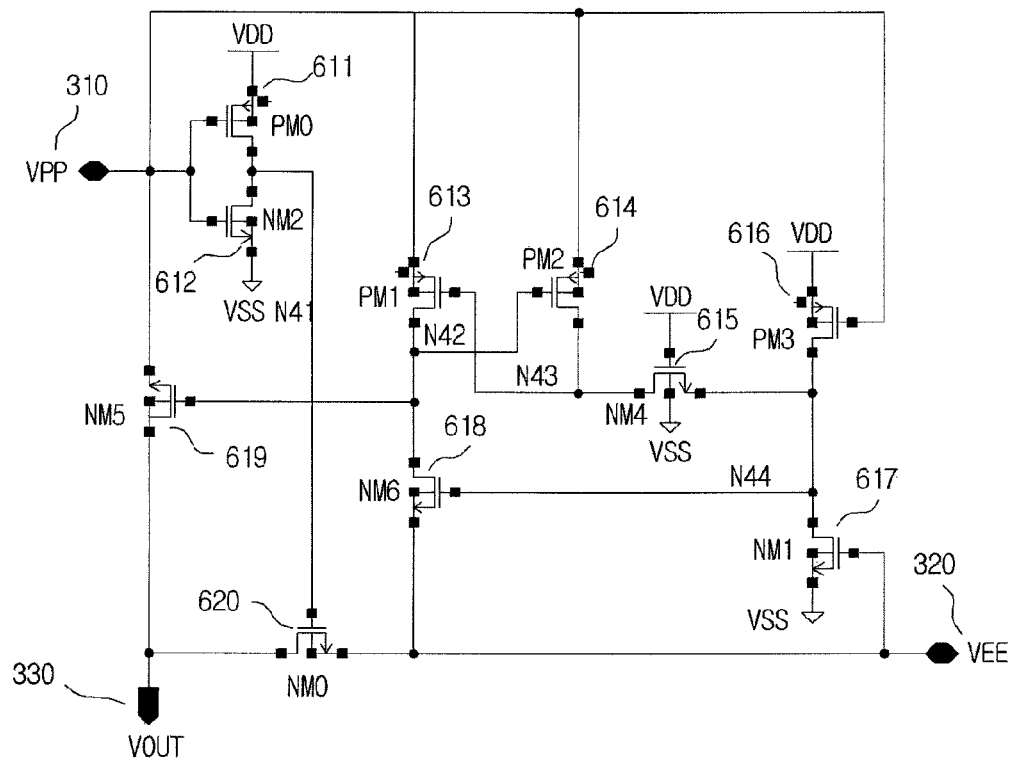

Example FIG. 7 illustrates a circuit diagram of a pump switch, in accordance with embodiments.

Figure 8:
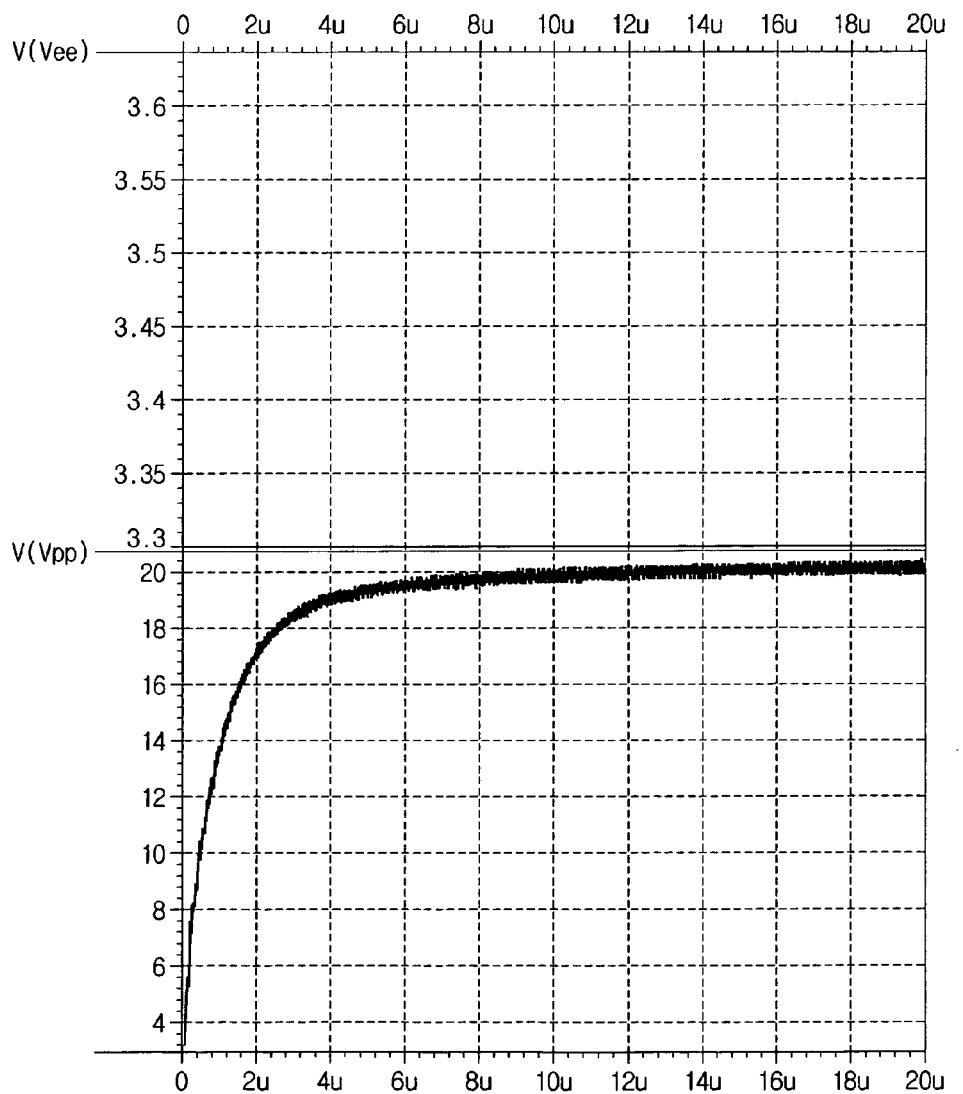

Example FIG. 8 illustrates a result diagram of a positive high voltage simulation by a charge pump, in accordance with embodiments.

Figure 9:
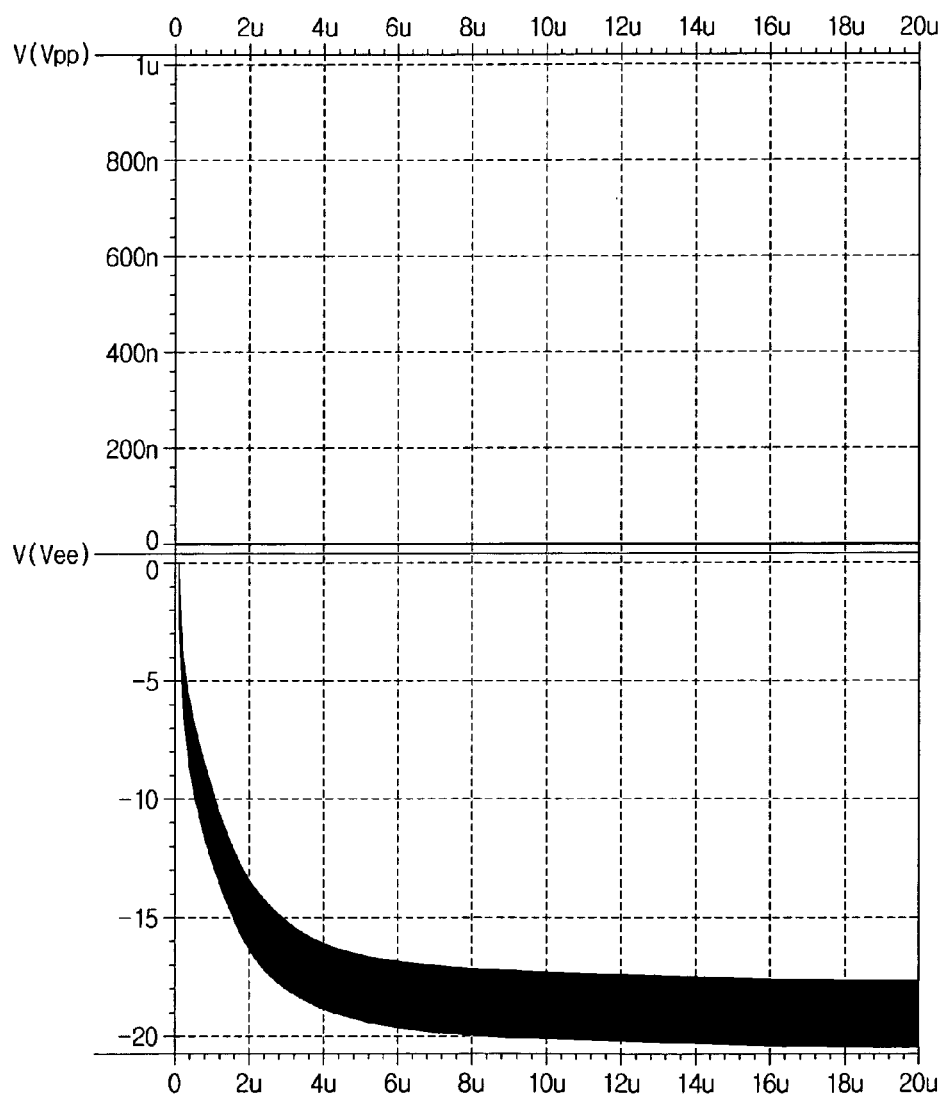

Example FIG. 9 illustrates a result diagram of a negative high voltage simulation by a charge pump, in accordance with embodiments.

Figure 10:
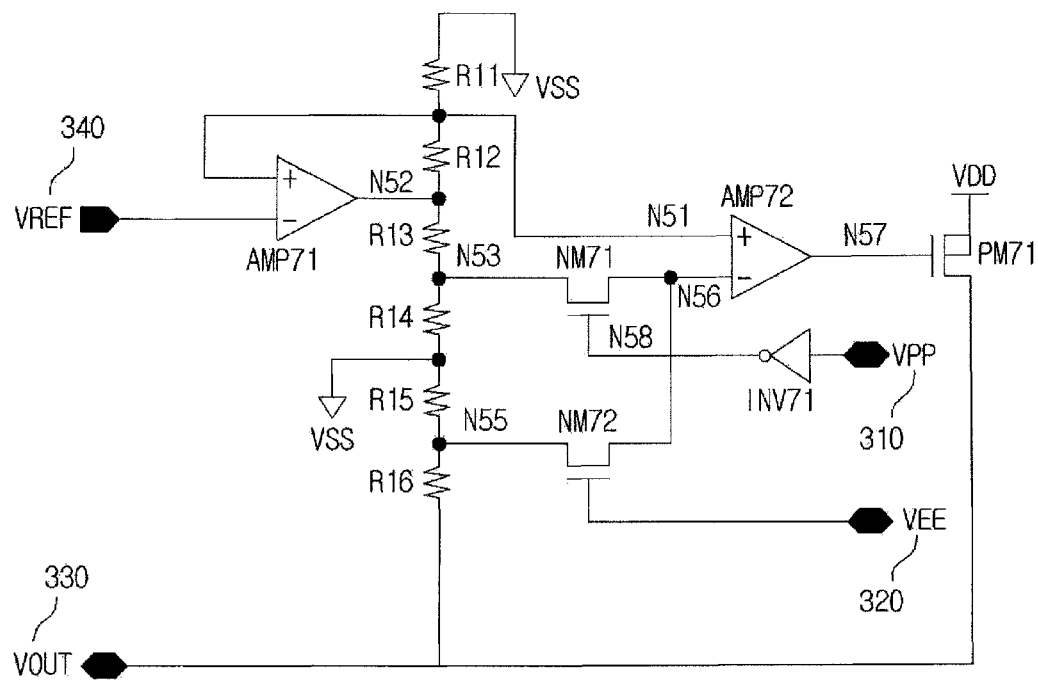

Example FIG. 10 illustrates a circuit diagram of a regulator, in accordance with embodiments.

Figure 11:
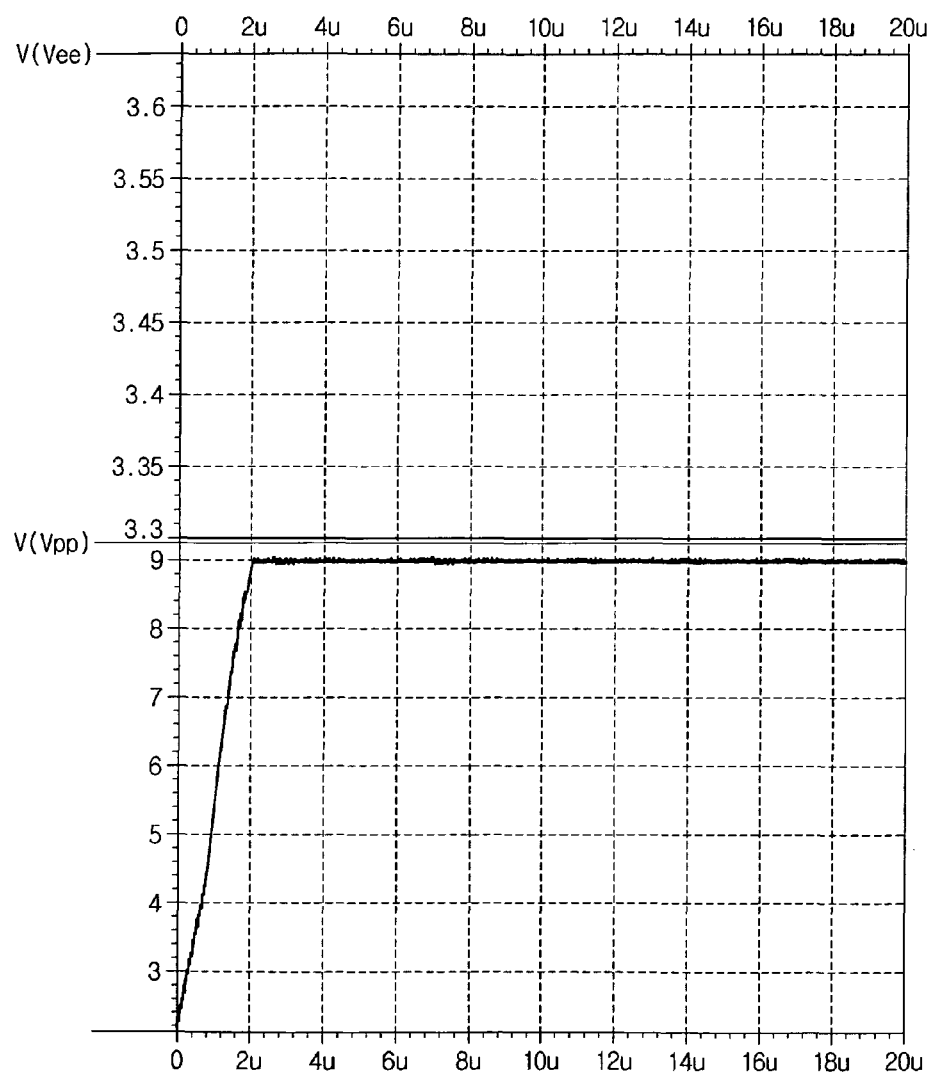

Example FIG. 11 illustrates a result diagram of a positive high voltage simulation by a charge pump and a regulator, in accordance with embodiments.

Figure 12:
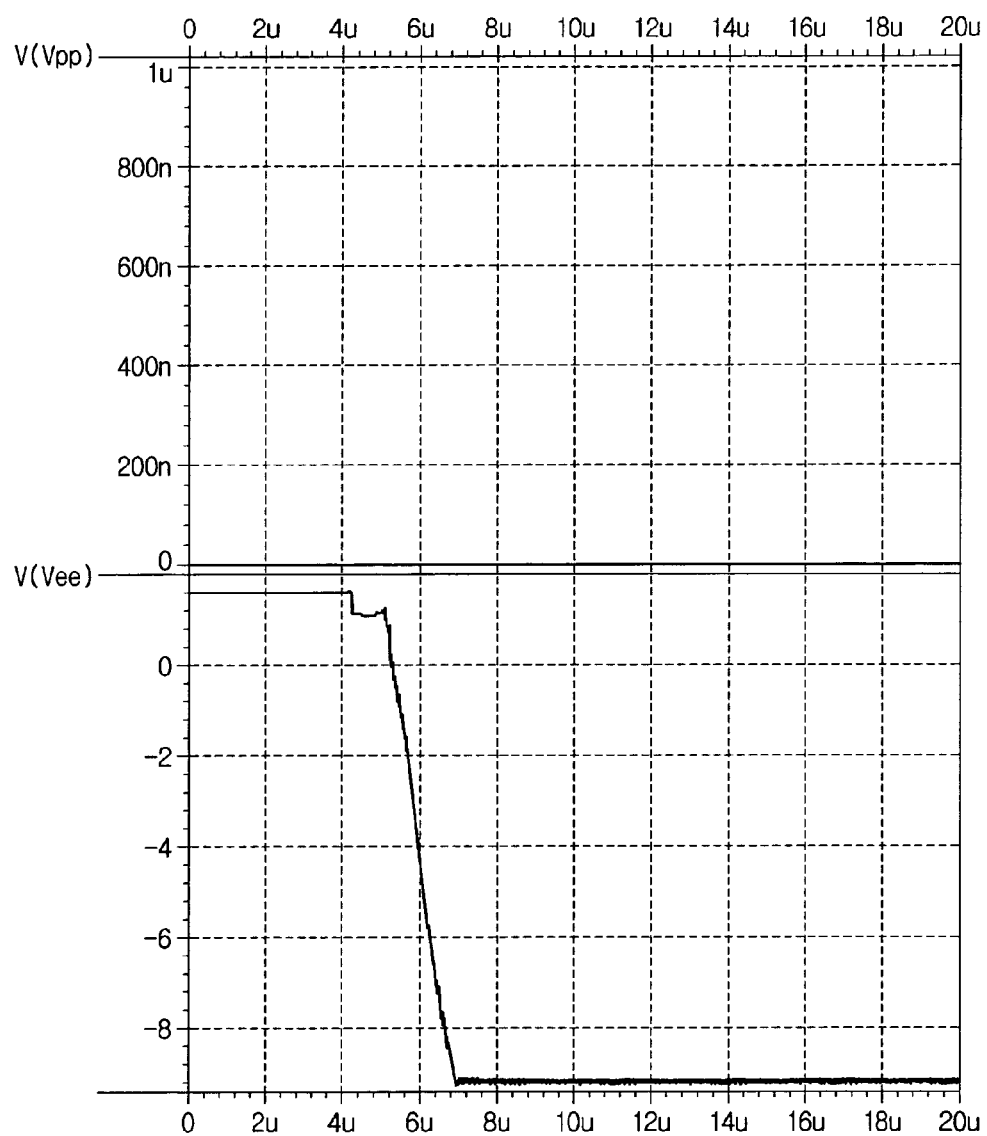

Example FIG. 12 illustrates a result diagram of a negative high voltage simulation by a charge pump and a regulator, in accordance with embodiments.

DESCRIPTION

Example FIG. 6A illustrates a voltage control apparatus of a semiconductor device, according to embodiments. A first input/output unit 12 may receive a power supply VDD and may output a negative high voltage. A second input/output unit 11 may receive a power supply VSS and may output a positive high voltage. Voltage booster 20 may be electrically connected to first input/output unit 11 and second input/output unit 12. Voltage booster 20 may receive a voltage input from one of first second input/output unit 11 and second input/output unit 12. Voltage booster 20 may boost the input voltage and output the boosted voltage.

Output selector 30 may receive a boosted voltage from voltage booster 20. Output selector 30 may select one of a positive voltage or a negative voltage to output. Output controller 40 may receive a boosted voltage from voltage booster 20 and control and/or regulate the output voltage. Output unit 50 may output a generated output voltage.

Example FIG. 6B illustrates a circuit of a voltage control apparatus of a semiconductor device, in accordance with embodiments. Input/output terminal VEE 320 in FIG. 6B may be represented by first input/output unit 12 in FIG. 6A. Input/output terminal VPP 310 in FIG. 6B may be represented by second input/output unit 11 in FIG. 6A. VOUT 330 in FIG. 6B may be represented by output unit 50 in FIG. 6A. Diode unit 410, clock unit 430, capacitor unit 420 in FIG. 6B may be represented by voltage booster 20 in FIG. 6A. Diode unit 410 may include a plurality of diodes D31, D32, D33, D34, and D35. Capacitor unit may include a plurality of capacitors C31, C32, C33, and C34. One of ordinary skill in the art would appreciate that any number of capacitors or diodes may be used in a capacitor unit or a diode unit.

Pump switch 440 in FIG. 6B may be represented by output selector 30 in FIG. 6A. Pump switch 440 may output a negative high voltage as VOUT 330 in a negative charge pump operation, in accordance with embodiments. Pump switch 440 may output a positive high voltage as VOUT 330 in a positive charge pump operation, in accordance with embodiments.

VREF 340 (e.g. a reference voltage input unit) in FIG. 6B may be represented by output controller 40 in FIG. 6A. A reference voltage may be input into VREF 340. Regulator 450 and VOUT 330 may output the voltage input from input/output terminal 310 or input/output terminal 320.

Charge pump unit 500 in FIG. 6B may be represented by first input/output unit 11, second input/output unit 12, voltage booster 20, and output selector 30 of FIG. 6A. Regulator unit 510 of FIG. 6B may be represented by output controller 40 of FIG. 6A.

Charge pump unit 500 may include input/output terminal VEE 320. VEE 320 may receive a voltage VDD during a positive charge pumping operation. VEE 320 may output a negative high voltage during a negative charge pumping operation. Input/output terminal VPP 310 may output a positive high voltage during positive charge pumping operation. Input/output terminal VPP 310 may receive a voltage VSS during a negative charge pumping operation. Charge pump unit 500 may include diode unit 410, capacitor unit 420, clock unit 430, pump switch 440, and output terminal VOUT 330, in accordance with embodiments. Power supply VDD may be used as a power supply to generate a positive high voltage during positive charge pumping operation.

Diode unit 410 may be used as a negative high voltage charge pump by being connected in the reverse direction as the direction used in a positive high voltage charge pump. For example, in embodiments, positive charge pumping may pump a positive voltage starting at VEE 320 and ending at VPP 310, while negative charge pumping may pump a negative voltage starting at VPP 310 and ending at VEE 320. Accordingly, in embodiments, diode unit 410 may be used for both a positive charge pump and a negative charge pump. In embodiments, using diode unit 410 in both a positive charge pump and a negative charge pump may be advantageous as it may reduce the number of components (and reduce manufacturing steps in making components), which may minimize costs.

Capacitor unit 420 may be sequentially connected to each line between diodes of diode unit 410. For example, capacitor C31 may be connected to the input of diode D31 and the output of diode D32. Capacitor C32 may be connected to the input of diode D32 and the output of capacitor D33. Capacitor D33 may be connected to the input of diode D33 and the output of diode D34. Capacitor C34 may be connected to the input of diode D34 and the output of capacitor D35.

First clock signal CLK1 and second clock signal CLK2 in clock unit 430 may be are alternatively connected to capacitors of capacitor unit 420. For example CLK1 may be connected to capacitor C32 and capacitor C34, while CLK2 may be connected to capacitor C31 and capacitor C33. A timing diagram for first clock signal CLK1 and second clock signal CLK2 are illustrated in example FIG. 2, according to embodiments. As illustrated in example FIG. 2, CLK1 and CLK2 have a phase difference of 180°.

Pump switch 440 may receive a voltage from both input/output terminal VPP 310 and input/output terminal VEE 320. Pump switch 440 may select which one of VPP 310 or VEE 320 to output to VOUT 330, depending on the operation mode of the charge pump. For example, if the charge pump is operating as a positive charge pump, VOUT 330 will be connected to VPP 310 through pump switch 440, while VEE will be disconnected from VOUT 330. If the charge pump is operating as a negative charge pump, then VOUT 330 will be connected to VEE 320, while VPP will be disconnected from VOUT 330. Example FIG. 7 illustrates an example circuit structure of pump switch 440, in accordance with embodiments.

Regulator unit 510 may include input terminal VREF 340, which may receive a reference voltage signal. Regulator unit 510 may be coupled to VEE 320 and VPP 310. Regulator 510 may be connected to VOUT 330.

For purposes of explanation and simplicity, it may be assumed that a threshold voltage Vth of diodes D31, D32, D33, D34, and D35 are the same. However, one of ordinary skill in the art would appreciate that diodes D31, D32, D33, D34, and D35 may have different threshold voltages Vth.

Input voltage VDD may applied to VEE 320 in a positive charge pump operation. As illustrated in clock input diagram of example FIG. 2, VSS (i.e. a ground voltage level) may be input into one terminal of capacitor C11 from CLK1 during time period T1. During time period T1, diode D35 may output a voltage of VDD−Vth (VDD in input into diode D35 and dropped by threshold voltage Vth of diode D35). Capacitor C34 may be charged to a value of Q1=C34×{(VDD−Vth)−VSS} from node N34.

During time period T2, CLK1 changes to input voltage VDD. Accordingly, the voltage at node N34 becomes 2VDD−Vth, which is the voltage level across capacitor C34 (that was charged in time period T1) plus the voltage VDD at the bottom of capacitor C34. During time period T2, the bottom of capacitor C33 is VSS (i.e. a ground voltage level) and the voltage 2VDD−2Vth (i.e. the output of diode D34, which is reduce by threshold voltage Vth) is input to the top of capacitor 33. During time period T2, capacitor C33 is charged to Q2=C33×{(2VDD−2Vth)−VSS}.

During time period T3, VDD from CLK2 is input to the bottom of capacitor C33. Accordingly, the voltage at node N33 becomes 3VDD−2Vth, which is input into diode D33. The output of diode D33 is 3VDD−3Vth at node N32. Since during time period T3, the bottom of capacitor C32 is VSS (i.e. ground) and the top of capacitor is 3VDD−3Vth, capacitor C32 is charged to Q3=C32×{(3VDD−3Vth)−VSS}.

This operation continues through diode D32 and diode D31, ultimately resulting in the output of diode D31 having a voltage 5VDD−5Vth. Accordingly, a charge pump can effectively increase a voltage level using clock signals, diodes, and capacitor. One of ordinary skill would appreciate than any number of capacitor and diodes may be used, depending on the application.

After a positive charge pumping operation, the positive high voltage VPP 310 and input voltage VEE 320 (i.e. VDD) are input into pump switch 440. Example FIG. 7 illustrates an example circuit for pump switch 440. Positive high voltage VPP 310 may be applied to gates of PMOS transistor PMO 611 and NMOS transistor NM2 612, which would turn NMOS transistor NM2 612 on and turn PMOS transistor PMO 611 off. VSS may be applied to node N41 to turn off NMOS transistor NMO 620, thus preventing VEE 320 from being connected to VOUT 330.

VEE 320 (i.e. the power supply voltage) may turn on NMOS transistor NM1 617, which will cause VSS to be applied to node N44, thus causing NMOS transistor NM6 618 and NM5 619 to be turned on. With NMOS transistor NM5 619 turned on, positive high voltage from VPP 310 will be applied to VOUT 330.

Example FIG. 8 illustrates an example result diagram of positive high voltage pumping simulation, in accordance with embodiments.

As illustrated in example FIG. 6B, VOUT 330 (e.g. applying a positive high voltage in a positive pumping operation) may be applied to regulator 450, in accordance with embodiments. A reference voltage (e.g. 1.0V) may be applied to VREF 340 of regulator 450. VPP 310 and VEE 320 may be applied to regulator 450.

As illustrated in example FIG. 10, VREF 340 may be applied to operational amplifier AMP 71. Accordingly, the same voltage as VREF 340 may be generated at node N51. By resistor R11 and resistor R12 having the same resistance value, a voltage of 2VREF (i.e. 2 times VREF) may be generated at the node N52. A voltage of node N51 may be applied to operational amplifier AMP72.

During a positive charge pump operation, positive high voltage VPP 310 may be applied to inverter INV71 (i.e. VSS may be applied to node N58, which is applied to the gate of NMOS transistor NM71), thus turning transistor NM71 off. VEE 320 (i.e. VDD during positive charge pumping operation) may be applied to the gate of the NMOS transistor NM72, thus turning transistor NM72 on. By transistor NM72 being turned on, the voltage of node N55 may be applied to node N56, which is applied to an input of operational amplifier AMP72.

A positive high voltage applied to VOUT 330 may be divided between resistors R11, R12, R13, R14, R15, and R16. Resisters R15, R14, R13, R12, and R11 may have the same resistance value R, in accordance with embodiments. The resistance value of R16 may be set in accordance with a desired output voltage, according to embodiments.

For example, R16 may be set to 8R to generating a positive high voltage 9V (e.g. when VREF is 1V). When the positive high voltage exceeds 9V, the voltage at node N55 rises above 1.0V by division of resistances. If node N55 rises above 1.0V, there will be a voltage difference between the node N51 input and node N56 inputs to operational amplifier AMP72, causing the voltage at node N57 (i.e. output of operational amplifier AMP72) to be lowered. The lowering of the voltage at node N57 will turn on PMOS transistor PM71, which will cause voltage discharge, this lowering the voltage level of VOUT 330.

During positive high voltage operation, when voltage of VOUT 330 drop below 9V, the voltage value at node N55 drops below 1.0V, causing the voltage at node N57 to rise. When the voltage of node N57 rises, PMOS transistor PM71 is turned off, which raises the voltage level of VOUT 330 to be regulated at a target output voltage. Accordingly, using at least one feedback mechanism, regulator 510 can regulate the output of VOUT 330, according to embodiments. Example FIG. 11 is an example result diagram of a positive high voltage simulation by a charge pump and a regulator, according to embodiments.

During a negative charge pumping operation, VSS is applied to the VPP 310, in accordance with embodiments. A negative high voltage charge pumping operation is generally opposite from a positive high voltage charge pumping operation. A negative high charge pumped voltage VEE 320 and pre-pumped negative voltage VPP 310 (e.g. VSS) are input into pump switch 440. As illustrated in example FIG. 7, VPP 310 (e.g. VSS) is applied to the gates of PMOS transistor PMO 611 and the NMOS transistor NM2 612, thus turning on PMOS transistor PMO 611 and turning off NMOS transistor NM2 612. Accordingly, VDD is applied to node N41 to turn on the NMOS transistor NM0 620 and output negative pumped high voltage VEE 320 to VOUT 330.

During a negative charge pumping operation, negative pumped high voltage VEE 320 turns off NMOS transistor NM1 617, in accordance with embodiments. VPP 310 (e.g. VSS) turns on PMOS transistor PM3 616, allowing VDD to be applied to node N44. By VDD being applied to node N44, NMOS transistor NM6 618 is turned on to apply negative pumped high voltage VEE 320 to the node N42, which causes NMOS transistor NM5 619 to be turned off, thus preventing VPP 310 from connecting to VOUT 330. Example FIG. 9 is an example result illustrating a negative pumped high voltage simulation, according to embodiments.

In a negative charge pumping operation, VOUT 330 may output a negative pumped high voltage and may be applied to regulator 450. An example reference voltage of 1.0V may be applied to VREF 340 in regulator 450. As illustrated in example FIG. 10, VREF 340 may be applied to operational amplifier AMP 71, resulting in the same voltage level as VREF 340 being generated at node N51 by resistors R11 and R12 have the same resistance value. A voltage of 2VREF may be generated at node N52. The voltage of node N51 may be applied to operational amplifier AMP72.

During a negative charge pumping operation, VPP 310 (e.g. VSS) may be applied to inverter INV71, to cause NMOS transistor NM71 to be turned on through node N58. The voltage of node N53 may be applied to node N56, which is applied to operational amplifier AMP72. VEE 320, which may be the negative pumped high voltage, may be applied to the gate of NMOS transistor NM72 to turn it off. A negative pumped high voltage may be applied to VOUT 330 and may be divided between resistors R11, R12, R13, R14, R15, and R16. The resistance values of R15, R14, R13, R12, and R11 may be the same (e.g. a value R). The resistance value of resistor R16 may be set in accordance with a desired output voltage.

For example, R16 may set to 8R for generating the negative high voltage 9V. When the negative high voltage becomes less than −9V, the voltage at node N53 may rise above 1.0V through resistance division. The voltage at node N53 may be applied to operational amplifier AMP72 through the NMOS transistor NM71 (which is turned on in a negative charge pumping operation), thus lowering the voltage at node N57. Due to a voltage difference between node N51 and node N56, the voltage at node N57 changes, thus turning on PMOS transistor PM71 to discharge VDD, which may boost VOUT 330 to 9V in a regulated fashion.

During a negative charge pumping operation, if the voltage of VOUT 330 becomes greater than −9V, the voltage value at node N53 applied to operational amplifier AMP72 may become less than 1.0V. The lowering of voltage at node N53 may cause a voltage difference between the inputs to operational amplifier AMP72, which may cause the voltage at node N57 to rise. A rise of voltage at node N57 may turn off PMOS transistor PM71 and consequently drop the voltage at VOUT 330 to −9V. Through feedback, a regulator may cause VOUT to be consistently output at −9V (or another set target output voltage). Example FIG. 12 illustrates a result diagram of a negative high voltage simulation by a charge pump and regulator, according to embodiments.

A voltage control apparatus that implements both a positive high voltage charge pump and a negative high voltage charge pump may assist in scaling down a system on a chip, in accordance with embodiments. In embodiments, a single regulator may be used for both a positive high voltage charge pump and a negative high voltage charge pump, thus assisting in scaling down a system on a chip. Scaling down of a system on a chip, may reduce manufacturing costs, reduce development costs, improve productivity, and have other benefits, in accordance with embodiments.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

What is claimed is:

1. An apparatus comprising:
   a first voltage input/output terminal and a second voltage input/output terminal;
   a voltage booster that receives a voltage from one of said first voltage input/output terminal and said second input/output terminal and outputs a boosted voltage from the other one of said first voltage input/output terminal and said second input/output terminal;
   an output selector that receives the boosted voltage from the voltage booster and selects any one of a positive or negative voltage to output; and
   an voltage regulator that receives the boosted voltage from the voltage booster and regulates the output voltage,
   wherein the output selector comprises a pump switch that selects output of a positive high voltage or a negative high voltage,
   wherein the pump switch comprises a first NMOS transistor,
   wherein a gate of the first NMOS transistor is connected to said first voltage input/output terminal and VSS is connected to a source/drain of the first NMOS transistor,
   wherein the pump switch comprises a first PMOS transistor,
   wherein a gate of the first PMOS transistor is connected to said first voltage input/output terminal and VDD is connected to a source/drain of the first PMOS transistor.

2. The apparatus of claim 1, wherein:
during a positive charge pumping operation, said first input/output terminal receives a positive power supply voltage VDD and said second input/output terminal outputs a positive charge pumped voltage; and
during a negative charge pumping operation, said second input/output terminal receives a negative power supply voltage VSS and said first input/output terminal outputs a negative charged pumped voltage.

3. The apparatus of claim 1, wherein the voltage booster comprises:
a diode unit electrically connected to said first voltage input/output terminal and said second voltage input/output terminal;
a capacitor unit electrically connected to the diode unit; and
a clock unit electrically connected to the diode unit and the capacitor unit.

4. The apparatus of claim 3, wherein:
the diode unit is connected in series between said first voltage input/output terminal and said second voltage input/output terminal; and
the capacitor unit is connected in parallel to the diode unit.

5. The apparatus of claim 3, wherein:
the clock unit comprises a first clock signal and a second clock signal, wherein the first clock signal and the second clock signal are 180 degrees out of phase; and
capacitors of the capacitor unit are each connected to one of the first clock signal or the second clock signal, wherein adjacent capacitor are connected to a different clock signal of the first clock signal and the second clock signal.

6. The apparatus of claim 1, wherein the pump switch comprises a second NMOS transistor, wherein a gate of the second NMOS transistor is connected to said second voltage input/output terminal.

7. The apparatus of claim 1, wherein the pump switch comprises a third NMOS transistor that receives VDD at the gate of the third NMOS transistor.

8. The apparatus of claim 1, wherein:
the voltage regulator comprises a reference voltage terminal; and
a voltage applied to the reference voltage terminal is used to regulate the boosted voltage.

* * * * *